United States Patent [19]
Hopkins et al.

[11] Patent Number: 5,383,107
[45] Date of Patent: Jan. 17, 1995

[54] HARMONIC CONTROL FOR AN INVERTER BY USE OF AN OBJECTIVE FUNCTION

[75] Inventors: Christopher E. Hopkins, Rockford; Albert L. Markunas, Roscoe; Vijay K. Maddali; Richard A. Arbanella, both of Rockford, all of Ill.

[73] Assignee: Sundstrand Corporation, Rockford, Ill.

[21] Appl. No.: 973,119

[22] Filed: Nov. 6, 1992

[51] Int. Cl.⁶ ............................................. H02M 1/12
[52] U.S. Cl. ........................................ 363/41; 363/42
[58] Field of Search ................................... 363/41, 42

[56] References Cited

U.S. PATENT DOCUMENTS

| | | | |
|---|---|---|---|
| 3,883,792 | 5/1975 | Ellert | 321/9 R |
| 4,382,275 | 5/1983 | Glennon | 363/41 |
| 4,387,421 | 6/1983 | Zach et al. | 364/148 |
| 4,519,022 | 5/1985 | Glennon | 363/41 |
| 4,527,226 | 7/1985 | Glennon | 363/41 |
| 4,581,696 | 4/1986 | Gyugyi et al. | 363/161 |
| 4,635,177 | 1/1987 | Shekhawat et al. | 363/41 |
| 4,829,416 | 5/1989 | Inaba et al. | 363/41 |
| 4,937,720 | 6/1990 | Kirchberg | 363/41 |
| 4,961,130 | 10/1990 | Kirchberg, Jr. | 363/41 |
| 4,974,140 | 11/1990 | Iba et al. | 363/74 |
| 4,989,128 | 1/1991 | Ohyama et al. | 363/41 |
| 4,994,956 | 2/1991 | Kirchberg et al. | 363/95 |
| 5,001,619 | 3/1991 | Nakajima et al. | 363/41 |
| 5,053,939 | 10/1991 | Kirchberg et al. | 363/41 |
| 5,055,992 | 10/1991 | Cook | 363/98 |
| 5,091,842 | 2/1992 | Kawai | 363/98 |
| 5,224,028 | 6/1993 | Lipman | 363/41 |

FOREIGN PATENT DOCUMENTS

| | | | |
|---|---|---|---|
| 58-19169 | 2/1983 | Japan | 363/41 |
| 91/03863 | 3/1991 | WIPO | H02M 1/12 |

OTHER PUBLICATIONS

Enjeti et al, "New Current Control Scheme for PWM Inverters," IEE Proc., vol. 135, Pt. B, No. 4, pp. 172–179, Jul. 1988.

Elhussein et al, "A Generalized Representation of PWM Wave forms," pp. 1–8, Dec. 1983 Midwest Power Symposium.

Henrichs et al "Relaxed Haromonic Elimination for Asynchronous Variable Speed Drives," Motor-Con. Sep. 1987 Proc., pp. 231–242.

Grady et al, "The Application of Network Objective Functions for Actively Minimizing the Impact of Voltage Harmonics in Power Systems," IEEE Trans. on Power Delivery, vol. 7, No. 3, pp. 1379–1386, Jul. 1992.

*Primary Examiner*—Jeffrey L. Sterrett
*Attorney, Agent, or Firm*—Jeffery J. Makeever

[57] ABSTRACT

A control unit for an inverter determines an objective function based upon harmonic content in a minimum number of the phase-to-phase AC voltages produced by the inverter and controls the switches of the inverter so as to minimize the objective function to thus control the harmonic content in the inverter output voltages.

The objective function may be defined according to the following equation:

$$F = \sum_{k=1,3,5...}^{NHARM} W_k\{(A_{kA} - A_{kB} - H_{A_kAB})^2 + (B_{kA} - B_{kB} - H_{B_kAB})^2 + (A_{kA} - A_{kC} - H_{A_kAC})^2 + (B_{kA} - B_{kC} - H_{B_kAC})^2\};$$

where $W_k$ are scaler weighting factors, $A_{kA}$, $A_{kB}$ and $A_{kC}$ are the Fourier cosine coefficients of the kth harmonic of the inverter phase A, B and C outputs, $B_{kA}$, $B_{kB}$ and $B_{kC}$ are the Fourier sine coefficients of the kth harmonic of the inverter phase A, B and C outputs, k is the number of the controlled odd harmonic (i.e., k=1, 3, 5 . . . ), and NHARM is the number of the highest controlled odd harmonic.

35 Claims, 8 Drawing Sheets

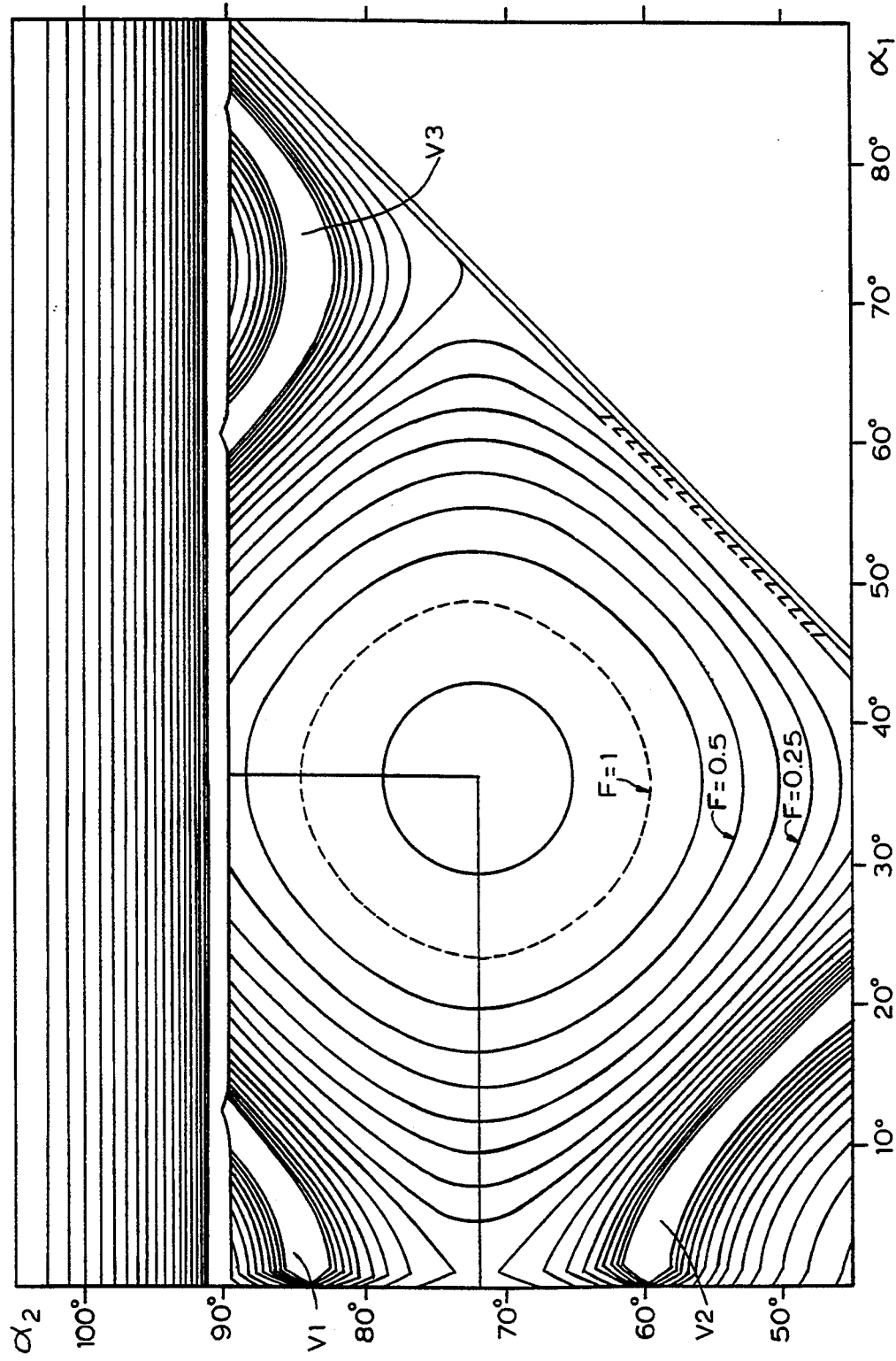

FIXED PATTERN

SELECTIVE HARMONIC ELIMINATION

THD MINIMIZATION

HARMONIC CONTROL FOR AN INVERTER BY USE OF AN OBJECTIVE FUNCTION

FIELD OF THE INVENTION

The present invention relates to inverters, and more particularly, to a control for a pulse-width modulated (PWM) inverter wherein the switching angles of the PWM pulses supplied to the inverter switches are arranged to eliminate harmonic components in the line-to-line inverter output voltages.

BACKGROUND OF THE INVENTION

PWM inverters are employed to convert DC power to AC power. In many applications, it is important to minimize harmonic distortion in the AC output power of the inverter. Such harmonic distortion can be minimized by proper selection of the PWM pulse pattern used to control the inverter. A PWM pulse pattern comprises a set of pulses which are used to control the switches of the inverter so that the output of the inverter, when filtered, will approximate a sinusoidal AC waveform. Each pulse has a leading edge switching angle and a trailing edge switching angle. Thus, if seven pulses are used to create one-half cycle of the output AC waveform, for example, these seven pulses have 14 switching angles.

It is known that the harmonic content in the output AC waveform of an inverter can be reduced by appropriate adjustment of the switching angles of the PWM pulses supplied to the switches of the inverter. For example, in Ellert, U.S. Pat. No. 3,883,792, a performance index is determined based upon the magnitudes of selected harmonics in the output of a converter. The switching angles of the PWM pulses supplied to the converter switches are selected so as to minimize this performance index. However, this system is only responsive to the magnitudes, but not the phase displacements, of the harmonics. If the loads coupled to the inverter remain balanced, load changes result in changes in the magnitudes, but not the phase displacements, of the harmonics in the inverter output voltage. On the other hand, in the case of unbalanced loads, a change in the loads changes both the magnitudes and the phase displacements of these harmonics. Thus, a system like that disclosed in the '792 patent wherein the phase displacements of the harmonics are not taken into account when adjusting switching angles can only be adequate when balanced loads are to be driven.

A system for adjusting the switching angles of PWM pulses supplied to the switches of an inverter is also shown in Glennon, U.S. Pat. No. 4,527,226. In this system, the output of an inverter is measured as a function of power factor. For each power factor, a set of switching angles is analytically derived to reduce the harmonic content in the output of the inverter. These sets of switching angles are then stored in a memory. Thereafter, during operation of the system, one of the angle sets is selected as a function of the power factor at the output of the inverter, and this set of switching angles controls the inverter to reduce the harmonic content in the inverter output. If the power factor changes, a different set of switching angles is chosen from the memory.

Since the PWM switching patterns of the '226 patent are stored in memory, only a finite number of sets of switching angles are available to regulate the output of the inverter. Accordingly, if the sensed power factor is other than one having a set of switching angles stored in the memory, the system selects a stored set of switching angles corresponding to the power factor closest to the sensed power factor such that the harmonic content in the inverter output is reduced. However, the harmonic content may still be considered undesirably large in this case.

Rather than rely upon a limited number of stored sets of switching angles, Shekhawat, et al., U.S. Pat. No. 4,635,177 discloses a method of on-line, real time generation of PWM waveforms based upon a depth of modulation value. The depth of modulation value is obtained by full-wave rectifying the actual output voltage from the inverter and subtracting a reference voltage therefrom. The reference voltage represents the desired inverter output voltage.

All of these systems assume a stiff DC link over which the DC power is conducted, i.e. a DC link where the DC voltage on the link has no ripple or substantial AC component. However, as a practical matter, the DC link is usually not stiff and the ripple on the DC link modulates the PWM pulses at the inverter output to produce additional harmonic content in the output of the inverter. Kirchberg, U.S. Pat. No. 4,961,130 recognizes the problems caused by ripple and other AC components on the DC link and undertakes a Fourier analysis at the output of the inverter to determine the Fourier coefficients of selected harmonics to be controlled in the output of the inverter. A stored pattern of PWM pulses is selected in accordance with the teachings of the '226 patent identified above, and the Fourier coefficients are used to advance or retard the switching angles of the selected pattern in order to substantially eliminate the controlled harmonics in the inverter output.

All of these systems are arranged to reduce the harmonic content in the phase-to-neutral voltages at the output of the inverter. Furthermore, either these systems ignore ripple on the DC input to the inverter entirely or perform a Fourier analysis only of the output of the inverter without also analyzing the voltage on the DC link.

SUMMARY OF THE INVENTION

Rather than reduce the line-to-neutral harmonic content in the output of the inverter, the present invention reduces the line-to-line harmonic content actually experienced by the load. This harmonic content reduction is accomplished in a three-phase system by controlling the harmonic content in only two of the three line-to-line voltages supplied by the inverter. Furthermore, the control of the inverter switches may be based on the harmonic content in the DC link voltage.

Thus, according to one aspect of the present invention, an inverter system includes an inverter for converting DC power into AC power having at least three phase-to-phase voltages. The inverter system also includes an inverter controller which determines a value for an objective function based upon the harmonic content in less than all of the phase-to-phase voltages and which controls the inverter switches so as to minimize the value of the objective function.

According to another aspect of the invention, an inverter system includes an inverter for converting DC power into AC power. The inverter system also includes an inverter controller having means responsive to harmonic content in the DC power in order to determine a value for an objective function as a function of harmonic content in the AC power. The inverter controller further includes means for controlling the switching angles of the inverter so as to minimize the value of the objective function.

According to a further aspect of the invention, a method of developing N phase-to-phase AC output voltages on N output lines comprises the steps of supplying DC power to a plurality of inverter switches, supplying PWM pulses to the inverter switches so as to convert the DC power into the AC voltages, determining a value for an objective function based upon the harmonics in less than all of the phase-to-phase AC voltages, and adjusting the switching angles of the PWM pulses in order to minimize the value of the objective function.

BRIEF DESCRIPTION OF THE DRAWINGS

These and other features and advantages will become more apparent from a detailed consideration of the invention when taken in conjunction with the drawings in which:

FIG. 3 comprises a three dimensional graph projected on two dimensions illustrating an objective function based upon only two switching angles;

FIGS. 5 and 6 comprise waveform diagrams illustrating the response of the present inverter system to load disturbances which affect the phase A output voltage;

DESCRIPTION OF THE PREFERRED EMBODIMENT

Figure 1:
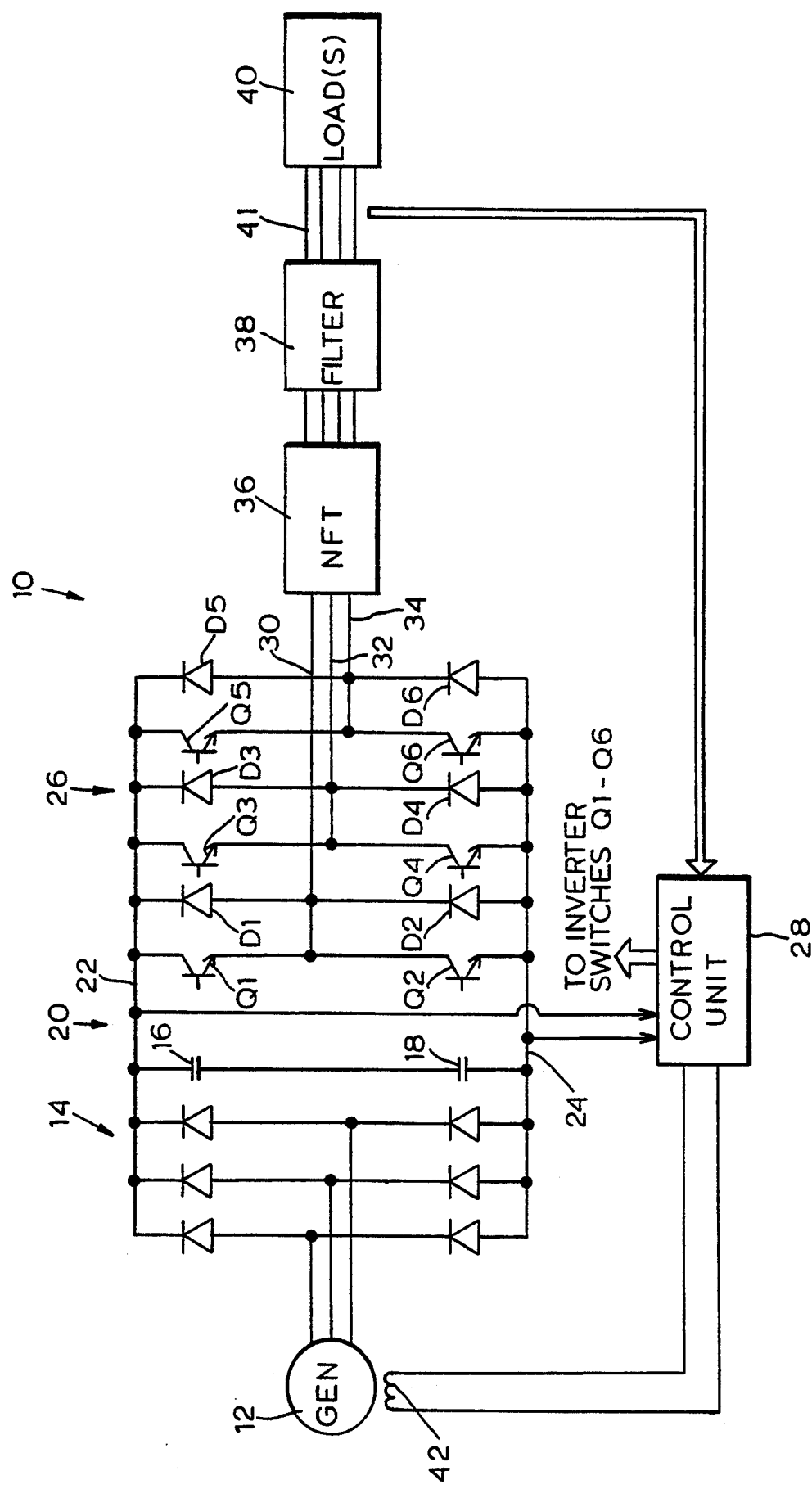
FIG. 1 comprises a simplified combined schematic and block diagram of an inverter system according to the present invention.

As shown in FIG. 1, an inverter system 10 includes a three-phase generator 12 driven by a variable-speed prime mover (not shown) such as an aircraft jet engine. The generator 12 is of the synchronous type and produces variable-frequency, three-phase power that is full wave rectified by a full wave rectifier 14 and filtered by a pair of filter capacitors 16 and 18. The output of the filter capacitors 16 and 18 comprises DC power which is supplied to a DC link 20 having a positive DC rail 22 and a negative DC rail 24.

The DC power on the DC link 20 is inverted to AC power by an inverter 26. The inverter 26 as shown in FIG. 1 includes six controllable power switches in the form of power transistors Q1-Q6 connected together with six flyback diodes D1-D6 in a conventional three-phase bridge configuration. The switches Q1-Q6 are operated by a control unit 28, which senses the voltage on the positive and negative DC rails 22 and 24, so as to control selected harmonics in the phase-to-phase AC voltages $V_{AB}$, $V_{BC}$, $V_{CA}$ developed across inverter output lines 30, 32 and 34. These harmonics, according to the preferred embodiment of the invention, include the odd harmonics of the inverter fundamental frequency up to and including the 19th harmonic. However, the control unit 28 can be arranged to control any selected number of harmonics.

A neutral forming transformer 36 is connected to the output of the inverter 26 and a filter 38 is coupled between the neutral forming transformer 36 and one or more load(s) 40.

The control unit 28 is responsive to the DC voltage on the DC link conductors 22, 24 and one or more parameters of power developed at a point of regulation (POR) and controls not only the inverter switches Q1-Q6, but also the application of power to an exciter field winding 42 of the three-phase generator 12. The exciter control methodology does not form part of the present invention and is, therefore, not disclosed in detail herein.

The control unit 28 supplies six PWM switching patterns to the inverter switches Q1-Q6. In order to prevent a short (or shoot-through condition) between the positive DC rail 22 and the negative DC rail 24, the "on" pulses in the patterns supplied to each of the positive rail switches (Q1, Q3 and Q5) and its corresponding negative rail switch (Q2, Q4 and Q6) are arranged so that they do not overlap. Also, the PWM switching patterns for the switches Q3 and Q4 are phase shifted essentially by 120° with respect to the PWM switching patterns for the switches Q1 and Q2, and the PWM switching patterns supplied to the switches Q5 and Q6 are phase shifted 240° with respect to the switching patterns for the switches Q1 and Q2. The resulting PWM output waveforms on the lines 30, 32 and 34 are thus phase shifted 120° with respect to one another.

Figure 2:
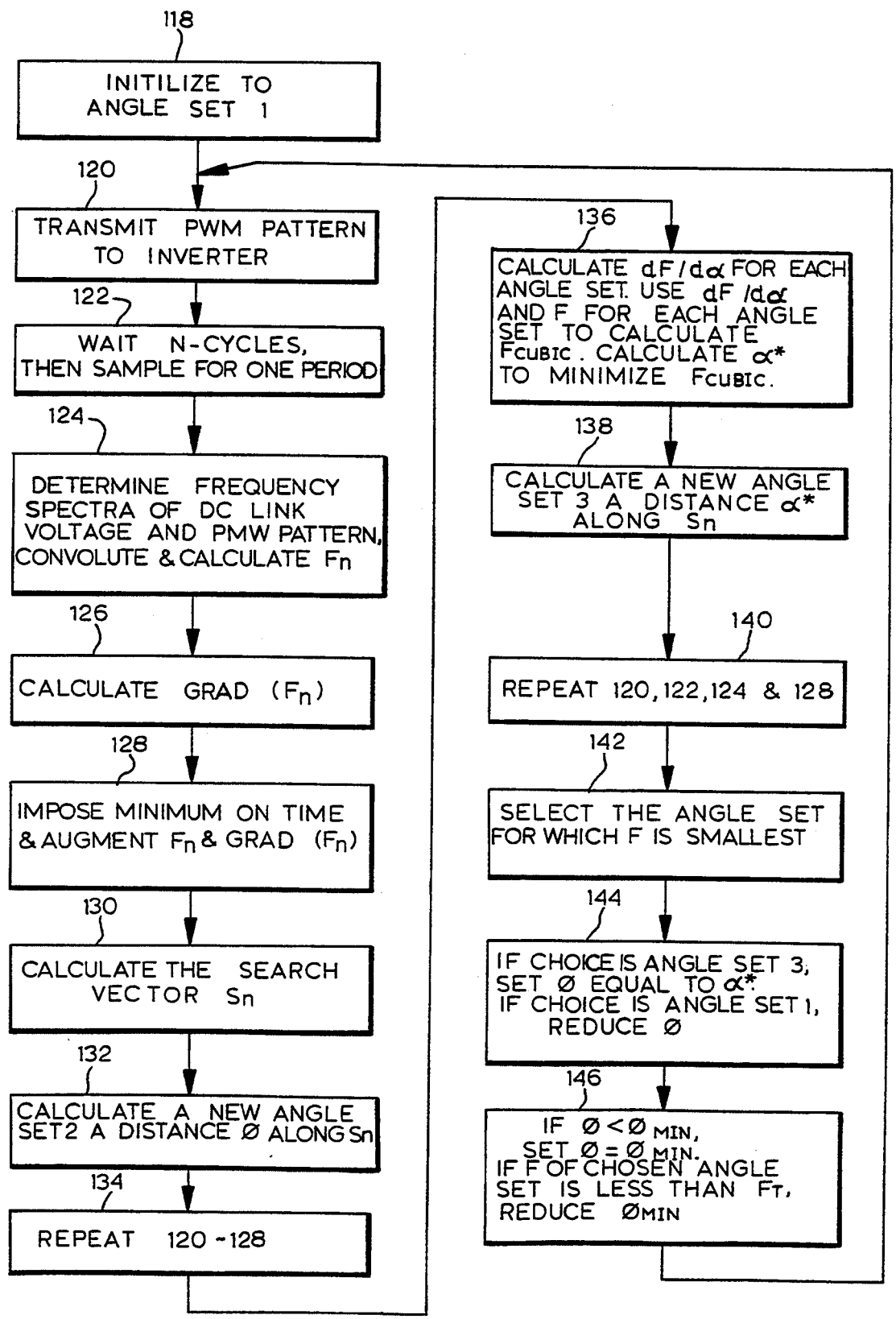
FIG. 2 comprises a flow chart illustrating the operation of the inverter controller of FIG. 1.

The control unit 28, which may be a microprocessor or other digital processor that executes a control software program, responds to the DC voltage on one or both of the positive DC rail 22 and the negative DC rail 24 in order to generate PWM patterns in accordance with the flow chart shown in FIG. 2. In general, the unit 28 undertakes an on-line gradient search optimization wherein an objective function is minimized. The objective function comprises the sum of the harmonic distortion in the line to line voltages $V_{AB}$, $V_{BC}$ and $V_{AC}$ resulting from the presence of harmonic components to be controlled. A set of weighting factors $W_K$ representing a weighting vector W is defined and used to control the harmonic distortion across the load.

A pair of blocks 118 and 120 of FIG. 2 initialize the inverter system 10 such that the inverter switches Q1-Q6 are operated in accordance with a first angle set or PWM pattern. This first angle set is analytically calculated beforehand (i.e. on an off-line basis) in order to obtain a desired depth of modulation for the inverter output. The depth of modulation is the ratio of the zero to peak value of the inverter output AC voltage to one-half of the inverter input DC voltage. Accordingly, the "on" pulses of the PWM switching pattern are long compared to the "off" pulses. A block 122 causes the control unit 28 to wait a predetermined number of cycles of the inverter output before sampling the DC voltage on the DC link 20. This predetermined number of cycles provides sufficient time for any transients in the system resulting from a change in switching patterns to die down. This sampling occurs over one period of the inverter output.

Based upon the sample of the DC link voltage, a block 124 performs a Fourier sine and cosine analysis (such as by a Fast Fourier Transform) of the DC link voltage in order to determine the frequency components of the DC link harmonic spectrum. This harmonic spectrum includes the harmonics affecting the output of the inverter 26 regardless of the source of the harmonics. The block 124 next analytically determines the idealized harmonic spectrum of the inverter output which would result from operating the inverter switches under the idealized assumptions that the DC link and load impedances are constant, that the load on the inverter is balanced and linear, and that no sources of harmonics, other than the PWM switching of the inverter switches, are present. In order to determine the actual harmonic content at the output of the inverter 26, the block 124 convolutes the idealized inverter output harmonic spectrum (i.e. the first set of switching angles transmitted by the block 120 to the inverter) with the DC link harmonic spectrum. If desired, the idealized inverter output harmonic spectrum may actually be convoluted with the harmonic spectrum of the voltage appearing at the junction between the capacitors 16 and 18 by dividing the Fourier sine and cosine coefficients of the DC link harmonic spectrum by 2, assuming that the capacitors 16 and 18 have equal capacitances. The results of the convolution are the sine and cosine Fourier coefficients of the phase voltages at the inverter output as a function of the harmonic spectrum of the voltage on the DC link 20.

These coefficients are then used by the block 124 to determine the following scalar objective function F:

$$F = \sum_{k=1,3,5...}^{NHARM} W_k \{(A_{kA} - A_{kB} - H_{AkAB})^2 + \quad (1)$$
$$(B_{kA} - B_{kB} - H_{BkAB})^2 + (A_{kA} - A_{kC} - H_{AkAC})^2 +$$
$$(B_{kA} - B_{kC} - H_{BkAC})^2\};$$

where $W_K$ are scalar weighting factors, $A_{kA}$, $A_{kB}$ and $A_{kC}$ are the Fourier cosine coefficients of the kth harmonic of the inverter phase A, phase B and phase C outputs, respectively, $B_{kA}$, $B_{kB}$ and $B_{kC}$ are the Fourier sine coefficients of the kth harmonic of the inverter phase A, phase B and phase C outputs, respectively, k is the number of the controlled odd harmonic (i.e., k=1, 3, 5 ... ), and NHARM is the number of the highest controlled odd harmonic (equal to 19 in the disclosed embodiment).

$H_{AkAB}$, $H_{BkAB}$, $H_{AkAC}$, and $H_{BkAC}$ in equation (1) are scalars defining the reference levels at which the phase-to-phase fundamental and harmonic voltages are to be controlled. In the case of the fundamental component of the output voltage, (i.e., k=1), the scalar $H_{A1AB}$ defines the desired fundamental cosine component of the normalized phase A to phase B voltage, and the scalar $H_{B1AB}$ defines the desired fundamental sine component of the normalized phase A to phase B voltage. $H_{A1AB}$ and $H_{B1AB}$ ensure that the phase A to phase B voltage at the fundamental frequency has a predetermined magnitude and phase. Similarly, when k=1, the scalars $H_{A1AC}$ and $H_{B1AC}$ are established such that the phase A to phase C voltage at the inverter fundamental frequency has the desired magnitude and phase. In the case of the harmonic components of the output voltage, (i.e., when k>1) the scalars $H_{AkAB}$, $H_{BkAB}$, $H_{AkAC}$, and $H_{BkAC}$ are all set to zero since it is desired to eliminate the phase A to phase B and phase A to phase C harmonic voltages.

The weighting factors $W_k$ are dependent upon both the number of independent switching angles in the switching pattern and the total number of harmonics being controlled. For example, if four times the number of the controlled harmonics is less than or equal to the number of switching angles in the three-phase PWM patterns, the control strategy is referred to as harmonic elimination and the weighting factors $W_k$ are set to unity (i.e. $W_K = 1$). Thus, if the odd harmonics from 1 to 19 are controlled, four times the number of odd harmonics is 40. As mentioned previously, a seven pulse per half-cycle pattern includes 14 independent switching angles per phase for a total of 42 switching angles for the three phases. In this example, therefore, $W_k$ (for k=1,3, ... 19) is set to unity.

On the other hand, if four times the number of the controlled harmonics is larger than the number of independent switching angles for all phases of the inverter, the objective function F becomes over-specified; that is, the objective function becomes overly influenced by the number of controlled harmonics as compared to the number of switching angles so that, if the objective function is not scaled down, its influence in the control system is too great and results in over control of the inverter 26. Accordingly, in this case the weighting factor $W_k$ is reduced. As an example, $W_k$ can be made equal to the squared modulus of the output filter frequency response function (i.e. $W_k = (V_{Filter\ output}/V_{Filter\ input})^2$) so that the objective function F more closely approximates the true three-phase harmonic distortion.

The objective function F determined by equation (1) is a scalar quantity which is to be minimized. By minimizing the objective function F, the fundamental components of the output voltages $V_{AB}$ and $V_{CA}$ are controlled at a desired level and odd harmonics of these voltages are substantially reduced.

In a full-bridge three-phase inverter like that shown in FIG. 1, only two of the output voltages are independent. Consequently, regulation of all three phase output voltages can be accomplished by controlling any two of the line-to-line voltages. Thus, the objective function F need only depend upon two of the three phase-to-phase voltages at the output of the inverter 18.

It should be noted that the first and third squared terms of the objective function F specify the cosine components of the phase A to phase B and phase A to phase C inverter output voltages, respectively, while the second and fourth squared terms specify the sine components of the phase A to phase B and phase A to phase C inverter output voltages, respectively. By taking into account both the sine and cosine components, both the magnitude and the phase of these voltages are controlled. Therefore, the output of the inverter can be controlled even when unbalanced loads are coupled thereto.

Once the objective function F has been calculated, a block 126 calculates the dimensional components of the gradient vector GRAD(F) in accordance with the following equation:

$$\text{GRAD}(F) = \left( \frac{\partial F}{\partial \alpha_1}, \frac{\partial F}{\partial \alpha_2}, \ldots, \frac{\partial F}{\partial \alpha_{NANG}} \right) \quad (2)$$

where $\alpha_1, \alpha_2 \ldots \alpha_{NANG}$ are the independent switching angles of one of the phases and $$\frac{\partial F}{\partial \alpha_i} = \quad (3)$$

-continued $$\sum_{k=1,3,5...}^{NHARM} 2W_k \Bigg\{ (A_{kA} - A_{kB} - H_{AkAB}) \left( \frac{\partial A_{kA}}{\partial \alpha_i} - \frac{\partial A_{kB}}{\partial \alpha_i} \right) +$$

$$(B_{kA} - B_{kB} - H_{BkAB}) \left( \frac{\partial B_{kA}}{\partial \alpha_i} - \frac{\partial B_{kB}}{\partial \alpha_i} \right) +$$

$$(A_{kA} - A_{kC} - H_{AkAC}) \left( \frac{\partial A_{kA}}{\partial \alpha_i} - \frac{\partial A_{kC}}{\partial \alpha_i} \right) +$$

$$(B_{kA} - B_{kC} - H_{BkAC}) \left( \frac{\partial B_{kA}}{\partial \alpha_i} - \frac{\partial B_{kC}}{\partial \alpha_i} \right) \Bigg\}$$

The partial derivatives with respect to the switching angles $\alpha_i$ are defined as follows for a three-phase system having seven pulses per half-cycle:

For $i = 1$ to 14:

$$\frac{\partial A_{kA}}{\partial \alpha_i} = \frac{\partial A_k}{\partial \alpha_i} \tag{4}$$

$$\frac{\partial B_{kA}}{\partial \alpha_i} = \frac{\partial B_k}{\partial \alpha_i} \tag{5}$$

$$\frac{\partial A_{kB}}{\partial \alpha_i} = \frac{\partial B_{kB}}{\partial \alpha_i} = \frac{\partial A_{kC}}{\partial \alpha_i} = \frac{\partial B_{kC}}{\partial \alpha_i} = 0 \tag{6}$$

For $i = 15$ to 28:

$$\frac{\partial A_{kB}}{\partial \alpha_i} = \frac{\partial A_k}{\partial \alpha_i} \tag{7}$$

$$\frac{\partial B_{kB}}{\partial \alpha_i} = \frac{\partial B_k}{\partial \alpha_i} \tag{8}$$

$$\frac{\partial A_{kA}}{\partial \alpha_i} = \frac{\partial B_{kA}}{\partial \alpha_i} = \frac{\partial A_{kC}}{\partial \alpha_i} = \frac{\partial B_{kC}}{\partial \alpha_i} = 0 \tag{9}$$

For $i = 29$ to 42:

$$\frac{\partial A_{kC}}{\partial \alpha_i} = \frac{\partial A_k}{\partial \alpha_i} \tag{10}$$

$$\frac{\partial B_{kC}}{\partial \alpha_i} = \frac{\partial B_k}{\partial \alpha_i} \tag{11}$$

$$\frac{\partial A_{kA}}{\partial \alpha_i} = \frac{\partial B_{kA}}{\partial \alpha_i} = \frac{\partial A_{kB}}{\partial \alpha_i} = \frac{\partial B_{kB}}{\partial \alpha_i} = 0 \tag{12}$$

where $$\frac{\partial A_k}{\partial \alpha_i} = (-1)^i \left( \frac{2}{\pi} \right) V_{DCLi} \cos(k\alpha_i) \tag{13}$$

and $$\frac{\partial B_k}{\partial \alpha_i} = (-1)^i \left( \frac{2}{\pi} \right) V_{DCLi} \sin(k\alpha_i). \tag{14}$$

where $V_{DCLi}$ is the magnitude of the DC link voltage at the instant in time defined by the ith switching angle.

As shown by equation (2), the gradient vector GRAD(F) has one dimension for each independent switching angle in each phase. In the present example, assuming seven pulses per half-cycle for each of three phases, NANG=42 and the gradient vector GRAD(F) has 42 dimensions.

The switching angles transmitted to the inverter 26 are all subject to minimum on-time requirements of the power transistors Q1-Q6 since power transistors will not switch if their gating signals are so short that they are not adequately driven into conduction. Therefore, it is typical in inverter systems using power transistor switches to impose minimum on-time constraints on the PWM switching patterns. A block 128 determines whether or not any of the first set of switching angles requires adjustment in order to avoid violating these minimum on-time constraints and, if so, augments the objective function F and the gradient vector GRAD(F) appropriately so that the control algorithm increases the widths of any pulses that are too narrow. Accordingly, for each of the "on" pulses which violate the minimum on-time constraints of the power transistors, the difference between the required minimum pulse-width for a power transistor and the width of each offending pulse is determined. The difference is cubed, multiplied by a predetermined scale factor, and added to the objective function F. Also, the difference is squared, multiplied by a second predetermined scale factor, and used to increase the angular distance between the pair of elements of the vector GRAD(F) corresponding to the switching angles of the offending pulse.

Following the block 128, a block 130 calculates dimensional components of a search vector $S_n$ according to the following equation:

$$S_n = -GRAD(F_n) + \beta S_{n-1} \tag{15}$$

where $\beta$ is determined by the following equation:

$$\beta = |GRAD(F_n)|^2 / |GRAD(F_{n-1})|^2. \tag{16}$$

The subscript n refers to the vector determined during a current pass through the program shown in FIG. 2 while the subscript n−1 refers to the vector determined during the immediately preceding pass through the program. It can be seen that the search vector $S_n$ shown in equation (15) has a first term relating to the negative of the gradient vector determined during the current pass through the program and a second term based in part upon vectors determined in the prior pass through the program. Where the system has just been initialized, the vector $\beta S_{n-1}$ is set to a zero length since there are no prior gradient and search vectors.

As seen in FIG. 3, the objective function F is plotted as a function of switching angle. For simplicity, the objective function F is plotted in FIG. 3 only as a function of switching angles $\alpha_1$ and $\alpha_2$ since to plot the objective function F as a function of all switching angles would result in a very complex graph and would obscure an understanding thereof. This graph shows three valleys V1, V2 and V3 where F=0. In order to achieve the greatest depth of modulation for the inverter 26, it is desirable to have off-times as narrow as possible and on-times as wide as possible in the PWM pulse pattern supplied to the inverter switches Q1-Q6. Therefore, the separation between $\alpha_1$ and $\alpha_2$ should be large. The valley V1 provides the greatest difference between $\alpha_1$ and $\alpha_2$ compared to the valleys V2 and V3. Therefore, when the first angle set is analytically determined, $\alpha_1$ and $\alpha_2$ are selected to be in the upper left portion of the graph shown in FIG. 4. This selection for the switching angles $\alpha_1$ and $\alpha_2$ ensures that, as the system searches for the optimum set of switching angles in order to eliminate the undesired phase-to-phase harmonic content at the output of the inverter, the system searches for the minimum of F in and around the valley V1, which results in the largest depth of modulation.

The gradient vector GRAD(F) is an indication of how the objective function F is changing as a function of each of the switching angles. Several search methods to find a minimum of a function are known. For example, the steepest descent method searches along the steepest gradient of the function. The method used by the present invention, however, is the Fletcher/Reeves method shown in equations (15) and (16). In this method, the gradient vector of the function is modified to converge faster to the minimum in the valley V1. According to the method, the negative of each element of the current gradient vector $GRAD(F_n)$ is added to each element of the previous search vector $S_{n-1}$ as modified by $\beta$. $\beta$ is determined by dividing the squared length of the current gradient vector $GRAD(F_n)$ by the squared length of the previous gradient vector $GRAD(F_{n-1})$.

The search vector has as many dimensions as the gradient vector GRAD(F), i.e. one for each of the switching angles. A block 132 normalizes the search vector $S_n$ by dividing each of the 42 dimensional components in the search vector $S_n$ by the square root of the sum of the squares of all of the dimensional components. The block 132 then multiplies each normalized dimensional component in the search vector $S_n$ by a scalar $\phi$. The scalar $\phi$ represents the incremental distance by which each switching angle is changed and is chosen to bring the search closer to the minimum F. If this incremental distance $\phi$ is too small, then the inverter controller 46 is too slow to close in on the optimum set of switching angles in order to minimize phase-to-phase harmonic content in the inverter outputs. On the other hand, if $\phi$ is too large, poor resolution results. Also, the incremental distance $\phi$ can be incremented unequally along the various dimensions. The block 132 adds the resulting dimensional components to the corresponding 42 switching angles of the first angle set transmitted to the inverter in order to derive a new or second angle set.

A block 134 then repeats the steps in blocks 120–128 by transmitting the second angle set to the inverter 26 (block 120), waiting for the predetermined number of cycles in order for transients to die down (block 122), convoluting the harmonic spectrum on the DC link with the second set of switching angles and recalculating the objective function F based upon the new phase-to-phase harmonic content at the inverter output resulting from the second angle set (block 124), redetermining the further gradient vector GRAD(F) as a function of the new phase-to-phase harmonic content resulting from the second switching angle set (block 126), and augmenting the recalculated objective function F and the redetermined gradient vector GRAD(F) based upon violations of any minimum on-time constraints by the second angle set (block 128). Hereinafter, the objective function calculated in the immediately preceding pass through the program is designated $F_1$ and the recalculated objective function calculated during the current pass is designated $F_2$.

Following the block 134, a block 136 uses the objective functions $F_1$ and $F_2$ and the gradient vectors $GRAD(F_1)$, $GRAD(F_2)$ associated with both the first and second angle sets in order to determine a quantity $F_{CUBIC}$ in accordance with the following equation:

$$F_{CUBIC} = a_0 + a_1\alpha + a_2\alpha^2 + a_3\alpha^3 \quad (17)$$

where $$a_0 = F_1 \quad (18)$$

$$a_1 = \frac{dF_1}{d\alpha} \quad (19)$$

$$a_2 = \frac{3\left(F_2 - F_1 - \frac{dF_1}{d\alpha}\phi\right) - \phi\left(\frac{dF_2}{d\alpha} - \frac{dF_1}{d\alpha}\right)}{\phi^2} \quad (20)$$

$$a_3 = \frac{-2\left(F_2 - F_1 - \frac{dF_1}{d\alpha}\phi\right) + \phi\left(\frac{dF_2}{d\alpha} - \frac{dF_1}{d\alpha}\right)}{\phi^3} \quad (21)$$

and where $$\frac{dF_1}{d\alpha} = \sum_{i=1}^{NANG} \frac{\partial F_1}{\partial \alpha_i} \cdot \frac{\partial \alpha_i}{\partial \alpha} = (GRAD(F_1) \cdot S_n) \quad (22)$$

$$\frac{dF_2}{d\alpha} = \sum_{i=1}^{NANG} \frac{\partial F_2}{\partial \alpha_i} \cdot \frac{\partial \alpha_i}{\partial \alpha} = (GRAD(F_2) \cdot S_n) \quad (23)$$

In determining $dF_1/d\alpha$ from equation (22), each element of the first gradient vector is multiplied by a corresponding element in the search vector $S_n$ and the resulting elements are summed. Similarly, in determining $dF_2/d\alpha$ from equation (23), each element of the second gradient vector is multiplied by a corresponding element in the search vector $S_n$ and the resulting elements are summed.

The block 136 determines a quantity $\alpha^*$, which, when substituted for $\alpha$ in equation (17), results in a minimum value for $F_{CUBIC}$. This is accomplished by differentiating $F_{CUBIC}$ with respect to $\alpha$, setting the resulting quantity equal to zero, and solving for $\alpha$. Since the resulting equation is a second order polynomial equation, two values of $\alpha$ will be found as solutions. To determine which of these two values of $\alpha$ results in the minimum $F_{CUBIC}$, the second derivative of $F_{CUBIC}$ with respect to e is taken. The two values of $\alpha$ are substituted into the second derivative, and that value of $\alpha$ which results in a zero value for the second derivative is assigned as the value of $\alpha^*$.

A block 138 multiplies each normalized dimensional component of the search vector $S_n$ by $\alpha^*$, and the resulting values are added to the second angle set in order to derive a third angle set.

A block 140 causes the operations performed by the blocks 120, 122, 124 and 128 to be repeated. Thus, the control unit 28 provides the third angle set to the inverter 26 (block 120), waits the predetermined number of cycles for any transients to die down (block 122), convolutes the harmonic spectrum on the DC link with the third set of switching angles and recalculates the objective function F based upon the resulting phase-to-phase harmonics at the output of the inverter (block 124), and augments the objective function F if any of the pulses determined by the switching angles in the third angle set violate the minimum on-time for any of the inverter transistors (block 128). It is not necessary to determine a gradient vector based upon this third angle set.

A block 142 selects that angle set of the first, second and third angle sets resulting in the smallest value for the objective function F. This selected angle set is then used to control the switches of the inverter 26.

If the selection made by the block 142 is the third angle set, a block 144 sets the value of $\phi$ equal to $\alpha^*$ because $\alpha^*$ was the step length which produced the smallest value for the objective function F.

On the other hand, if the block 142 selected the first angle set, neither the step length $\alpha^*$ nor the step length $\phi$ resulted in a value for the objective function closer to the minimum in the valley V1 than the value associated with the first angle set. Thus, $\phi$ and $\alpha^*$ were too large and hence, the correction step $\phi$ is reduced by an arbitrary amount, for example 50%, before the system performs another iteration in order to minimize the objective function F. If the second objective function associated with the second angle set is the smallest, then the step length $\phi$ is not changed.

In addition to the foregoing, load perturbations, such as when a load is first applied to the system of FIG. 1, can cause unusual changes in the inverter output voltage. These unusual changes, in turn, can cause exaggerated changes in $F_{CUBIC}$ which result in calculation of an inappropriate value for $\alpha^*$. To prevent this, $\alpha^*$ is limited by the block 144 to twice $\phi$.

A block 146 prevents the block 144 from reducing $\phi$ to a value below a minimum value $\phi_{MIN}$. Otherwise, the step changes in switching angles can become too small and the system can become too slow to respond to the phase-to-phase harmonic content in the output voltages of the inverter 26. However, if the objective function F of the selected angle set is less than a threshold $F_T$, $\phi_{MIN}$ is reduced by a predetermined amount, such as by 25%. This reduction allows for a shorter step length in the case where the objective function values are small.

Furthermore, the block 146 may also, if desired, be arranged to alternatively control the inverter switches if there is a certain change in distortion, such as 25%. Distortion is defined as the RMS value of the total inverter output (i.e. the fundamental plus the harmonic voltages) less the RMS value of just the fundamental voltage. Since the inverter controller 46 may be incapable of correcting such a large change and, in fact, may increase the distortion rather than decrease it in such an event, the block 146 can be arranged to supply a fixed pattern to the inverter 26 under this condition.

Following the block 146, control returns to the block 120 in order to transmit the angle set selected by the block 142 to the inverter 26. During this second pass through the program, the angle set selected by the block 142 is utilized as the first angle set. Thus, the control unit 28 determines a value for the objective function F and a gradient vector GRAD(F) associated with this first angle set, determines the search vector $S_n$, determines a second angle set based upon the search vector $S_n$, and determines a third angle set, all as described above. However, the search vector $S_n$ is now based not only upon the gradient vector for the new, first angle set but also upon the search vector $S_{n-1}$ used in the previous iteration. The block 142 selects which of the three angle sets results in the smallest value for the objective function F. The block 120 transmits that angle set to the inverter, and the system performs a third iteration or pass through the programming, and so on.

Figure 4A:
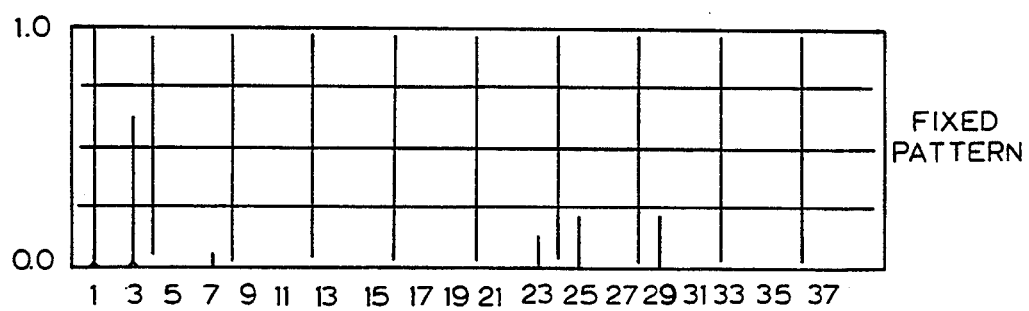
FIGS. 4A-4C comprises graphs illustrating the relative harmonic content resulting from a fixed pattern controller and the controller of the present invention.
Figure 4B:
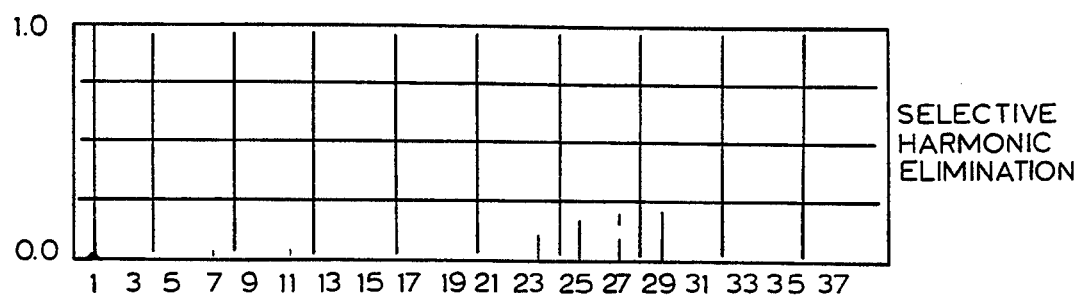
Figure 4C:
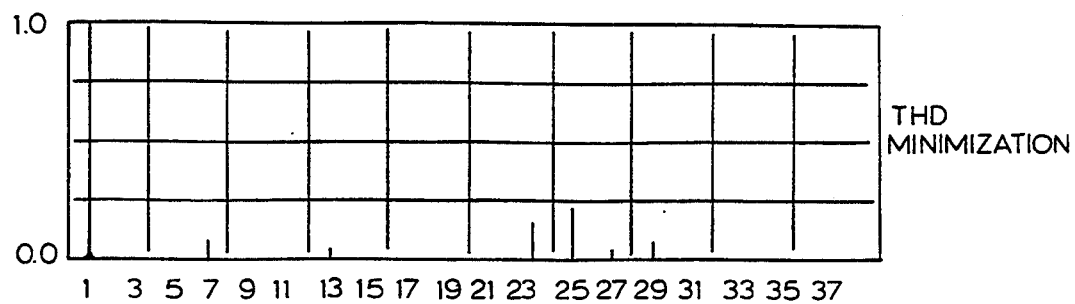

FIGS. 4A–4C show the magnitudes of the normalized phase-to-phase fundamental and harmonic voltages resulting from the simulation of a fixed pattern PWM inverter control system (FIG. 4A) and the simulation of a PWM inverter control system according to the present invention where $W_k=1$ (FIG. 4B) and $W_k \neq 1$ (FIG. 4C). In a fixed pattern system in which one of a plurality of stored fixed patterns is selected depending upon sensed parameters, the third harmonic is fairly large and the seventh harmonic is relatively small. The other harmonics up to the 23rd harmonic are substantially non-existent. In FIG. 4A, the 23rd harmonic, the 25th harmonic and the 29th harmonic are larger than the 7th harmonic. These high frequency harmonics can be filtered using lightweight and relatively inexpensive filters. However, the total harmonic distortion represented by the 3rd, 7th, 23rd, 25th and 29th harmonics is relatively large, i.e. about 3.95% of the fundamental.

FIG. 4B illustrates that the odd harmonics up to and including the 19th harmonic are controlled. While the third harmonic is eliminated and the 7th harmonic is reduced, the 11th and 27th harmonics appear. Here, the total harmonic distortion is less than in the fixed pattern system, i.e. about 3.26% of the fundamental.

FIG. 4C illustrates that odd harmonics up to and including the 37th harmonic are controlled. Here, the 7th harmonic is somewhat larger, the 13th harmonic appears, but the 27th and 29th harmonics are greatly reduced. The total harmonic distortion in this case is approximately 2.93% of the fundamental.

Figure 5:
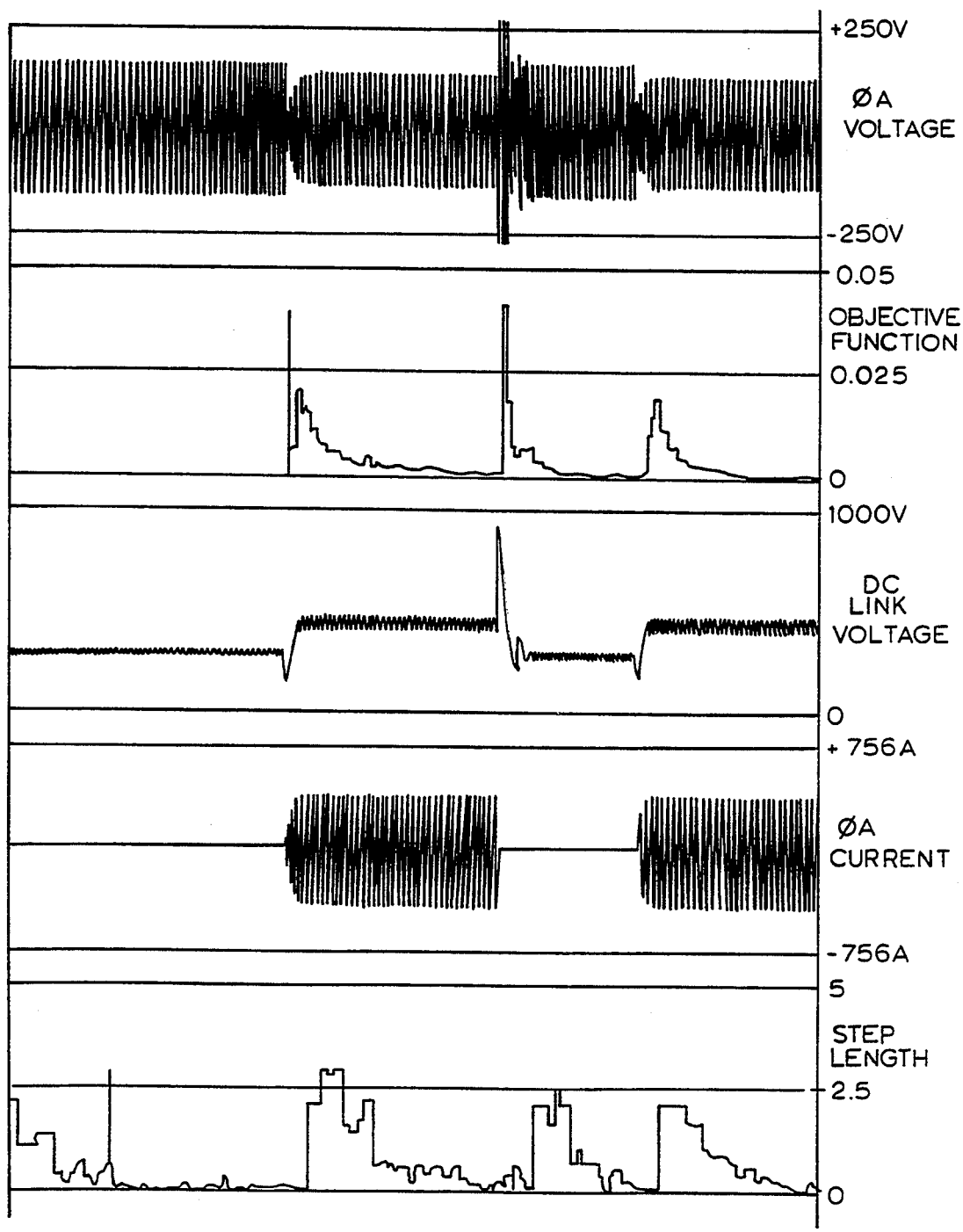
Figure 31:
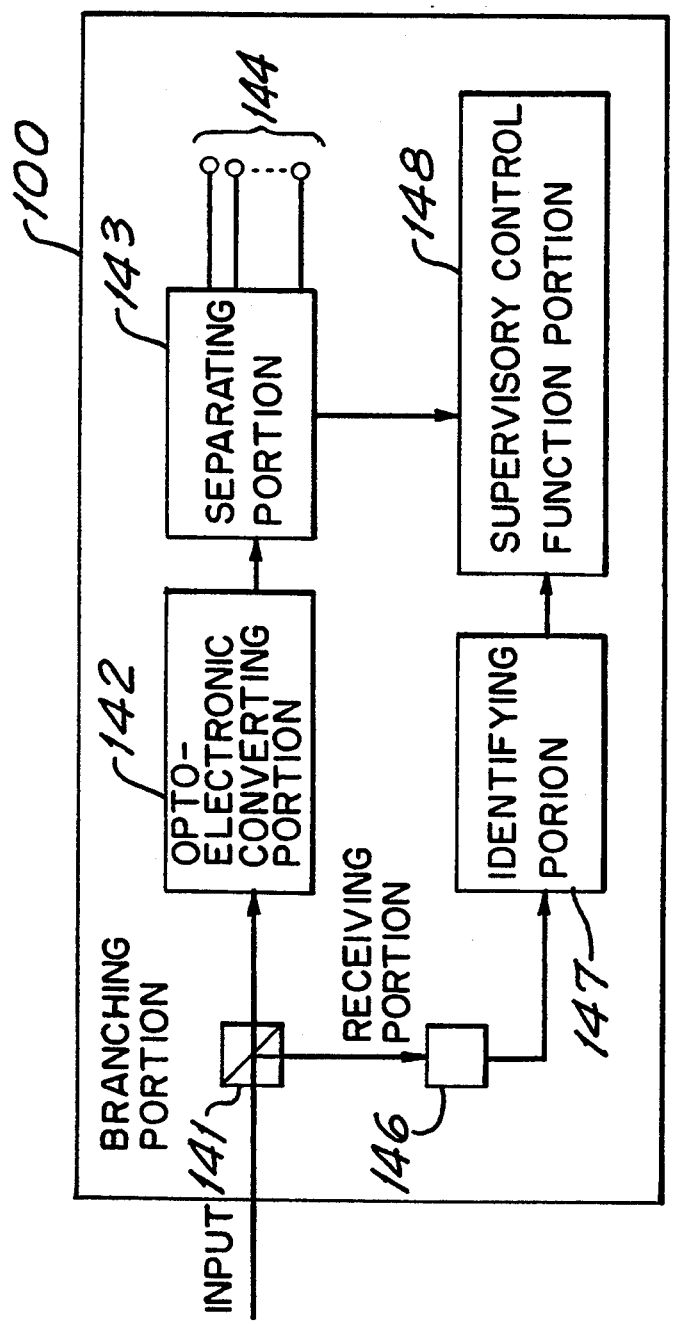

FIGS. 5 and 6, showing the results of a test of a simulated system according to the present invention, can be laid side-by-side to show how the present system responds to changes in the output voltage from the inverter. The top graph of FIGS. 5 and 6 shows the phase A voltage at the load line 41. The changes in the phase A voltage are primarily caused by load changes.

The second graph in FIGS. 5 and 6 shows the objective function as it is influenced by the harmonic content in the inverter output. The objective function is initially controlled at a low level when the phase A voltage is undisturbed. The first disturbance in the phase A voltage results in a substantial change in the objective function due to the increased harmonic content in the inverter output voltage. The system responds to this greatly increased objective function by seeking a set of switching angles which decreases the objective function to zero.

The third graph in FIGS. 5 and 6 shows the DC link voltage. When the phase A voltage is steady, the DC link voltage is steady with little ripple. However, changes in the inverter output are reflected back through the inverter to the DC link and result in ripple superimposed upon the DC link voltage. Accordingly, each disturbance of the phase A voltage will result in a corresponding disturbance of the DC link voltage.

The fourth graph of FIGS. 5 and 6 shows the phase A current.

The last graph of FIGS. 5 and 6 shows the step lengths by which the switching angles are changed in order to reduce the objective function to in turn reduce the phase-to-phase harmonic content in the inverter output. As can be seen from this graph, the step length increases as the objective function increases and decreases as the objective function decreases.

Figure 7:
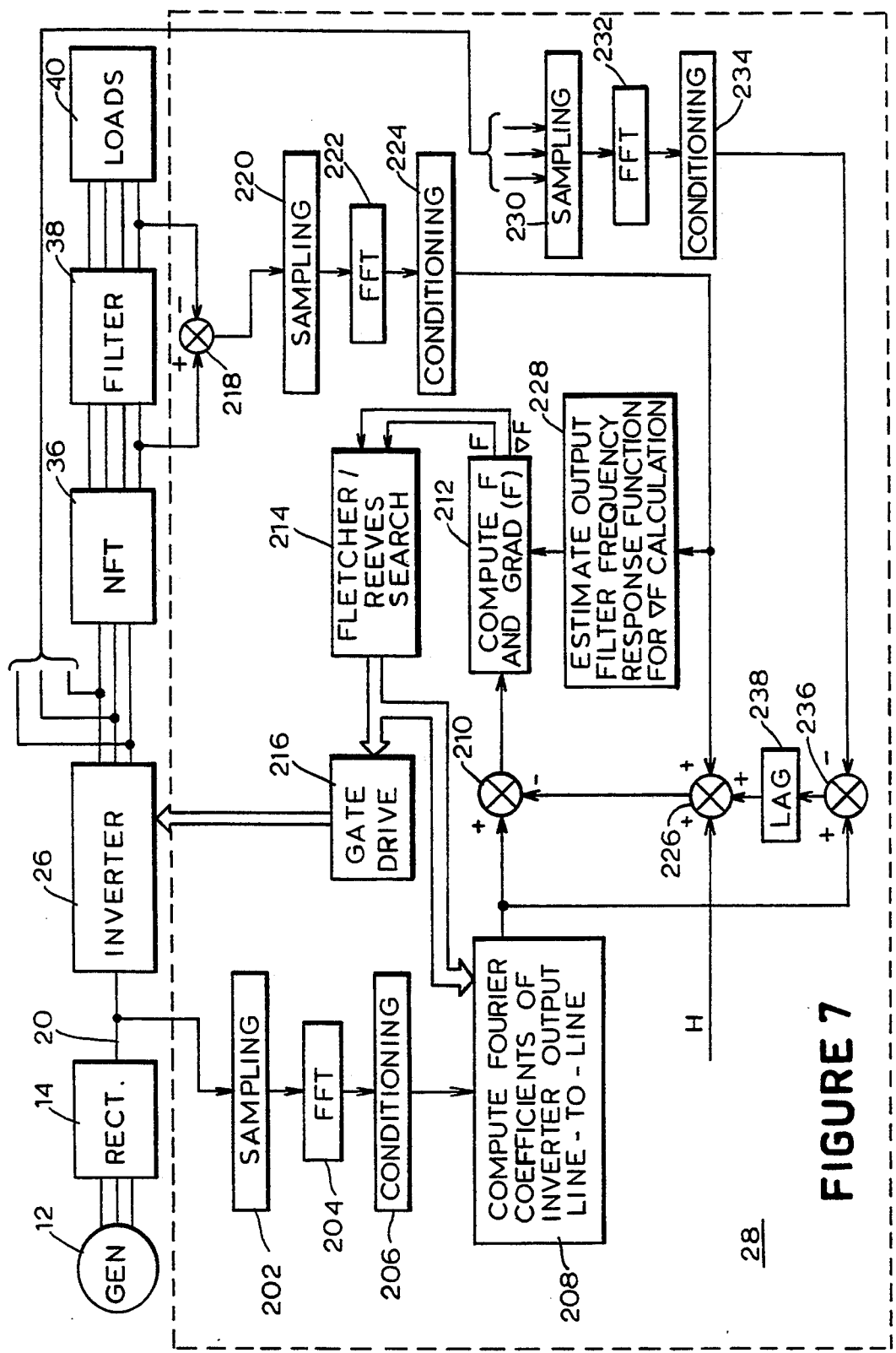
FIG. 7 comprises a simplified combined schematic and block diagram of an inverter system according to another embodiment of the present invention; and, FIGS. 8A-8C are graphs useful in explaining the embodiment of the present invention shown in FIG. 7.

FIG. 7 shows modifications of the arrangement illustrated in FIGS. 1 and 2 in order to compensate for line-to-line voltage drops across the filter 38 at the frequencies of the controlled harmonics and for distortions in the output voltages of the inverter 26 caused by the non-ideal inverter switches and components. It should be understood that the diagram shown in FIG. 7 is a block diagram combining the hardware shown in FIG. 1 with the program shown by the flow chart of FIG. 2 and is meant only to illustrate the modifications to be made to the program shown in FIG. 2 to accomplish the aforementioned compensation.

As shown in FIG. 7, the signal on the DC link 20 is sampled by an analog to digital sampler 202. A Fast Fourier Transform (FFT) block 204 operates upon the digital samples from the sampling block 202 to determine the Fourier coefficients of the harmonic spectrum on the DC link 20. A conditioning block 206, if desired, may normalize these Fourier coefficients from the block 204, and may correct these Fourier coefficients from the block 204 for any lag caused by the sampling process. A block 208 translates these Fourier coefficients to the inverter output by convoluting the normalized Fourier coefficients from the block 206, which represent the harmonic spectrum on the DC link 20, with the Fletcher/Reeves switching angles received from a Fletcher/Reeves search block 214.

These Fourier coefficients from the block 208 are the A and B terms in equation (1) for the phase A, phase B, and phase C harmonic voltages at the output of the inverter 26. These coefficients are supplied through a summer 210 to a block 212 which computes the objective function F and the gradient vector GRAD(F) according to equations (1), (2) and (3). The objective function and the gradient vector are supplied to the block 214 which performs the Fletcher/Reeves search, as discussed above in connection with FIG. 2, for the optimal set of switching angles in order to achieve an objective function F which is located in valley V1 as shown in FIG. 3. This set of switching angles is supplied to a gate drive block 216 which quantizes the switching angles from the Fletcher/Reeves block 214 and causes the quantized switching angles to be transmitted to the switches of the inverter 26.

For example, the gate drive block may be a pattern generator which has 8192 switching points of control to produce a 360° sinusoidal wave. However, since the resolution of the Fletcher/Reeves switching angles may be greater than the 8192 points per 360° any change in the Fletcher/Reeves switching angles produced by the Fletcher/Reeves block 214 may not pass through the gate drive block 216 if the change in the switching angles found by the Fletcher/Reeves search are too small for the resolution of the gate drive block 216. Thus, the Fletcher/Reeves switching angles rather than the switching angles from the gate drive block 216 are fed back to the block 208 so that the Fletcher/Reeves switching angles can be convoluted with the harmonic spectrum on the DC link 20 to permit calculation of the objective function F and the gradient vector GRAD (F). Otherwise, the objective function F does not change smoothly and the quality of the AC power at the output of the inverter 26 suffers.

The blocks 202–216 described above perform essentially the same functions as those shown in FIG. 2. Since the block 208 convolutes the switching angles which are used to control the inverter 26 with the harmonic spectrum on the DC link 20, the control unit 28 is controlling the inverter output voltage at the levels set by the H terms in equation (1). However, if the filter 38 is an imperfect filter, the filter 38 will alter the voltage at its input and will supply a voltage to the loads 40 which is different than the desired voltage. Blocks 218–228 compensate for any effects that the filter 38 has on the output voltage from the inverter 26.

Although the sensing of the voltage across only one leg of the filter 38 is shown in FIG. 7 (for example, the phase C leg) for clarity, it should be understood that the voltages across all legs of the filter 38 are sensed and are used to compensate the appropriate terms in equations (1), (2) and (3). Thus, using only one leg of the filter 38 as an example, the input to filter 38 for that phase is connected to the "plus" input of a summer 218 whereas the output from the filter 38 for that phase is connected to the "minus" input of the summer 218. The summer 218 thus senses the voltage across one leg of the filter 38. A sampling block 220 digitally samples the phase voltages using a selected sampling frequency. A Fast Fourier Transform (FFT) block 222 operates upon the digital samples from the sampling block 220 and, since in actuality all three legs of the filter are sampled by the block 220, the block 222 produces line-to-line Fourier coefficients of the line-to-line voltage drops across the filter 38. A conditioning block 224, if desired, may normalize these Fourier coefficients from the block 222. Accordingly, the conditioning block 224 supplies terms corresponding to the $H_{AkAB}$, $H_{BkAB}$, $H_{AkAC}$, and $H_{BkAC}$ terms of equation (1). These Fourier coefficients are then supplied to a summer 226. The reference H terms of equation (1), representing the desired level for each of the controlled harmonics, are supplied to another input of the summer 226.

As previously discussed, the value of the H terms for the fundamental frequency is the voltage which is desired for the fundamental frequency. The value of the H terms for the odd harmonics of the fundamental frequency should all be zero in order to suppress these harmonics. However, if the voltage appearing across the filter 38 for the fifth harmonic, for example, is $\Delta v_5$, then $\Delta v_5$ should be added to the reference H terms corresponding to the fifth harmonic. Thus, the inverter input voltage at the fifth harmonic will be controlled at $\Delta v_5$ and, since the output of the filter 38 is $\Delta a_5$ less than its input for the fifth harmonic, the output of the filter 38 at the fifth harmonic will be zero. Accordingly, in order to control the output of the filter 38 at zero for all of the controlled odd harmonics, the magnitudes of the reference H terms supplied to the summer 226 are increased by corresponding H terms reflecting the amount of the line-to-line voltage drops across the filter 38 at each of the controlled odd harmonics. The resulting corrected H terms from the summer 226 are supplied as negative quantities by the summer 210 to the block 212 which computes the objective function F according to equation (1). Thus, the output of the inverter 26 for each harmonic will be adjusted as appropriate in order to compensate for the line-to-line harmonic voltage drops across the filter 38.

Figure 8A:
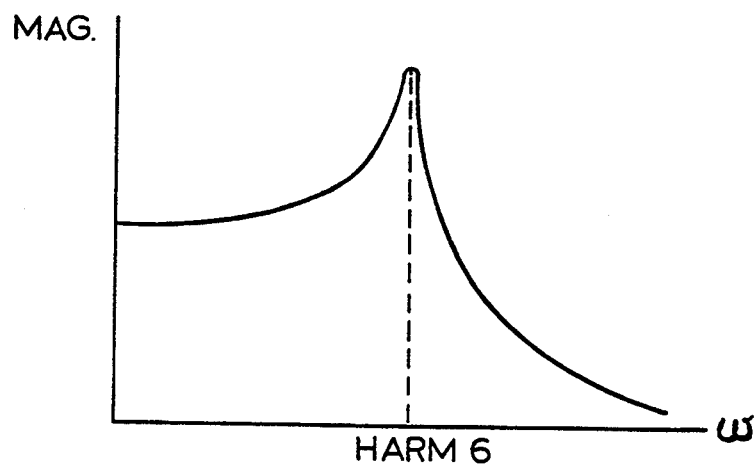
Figure 8B:
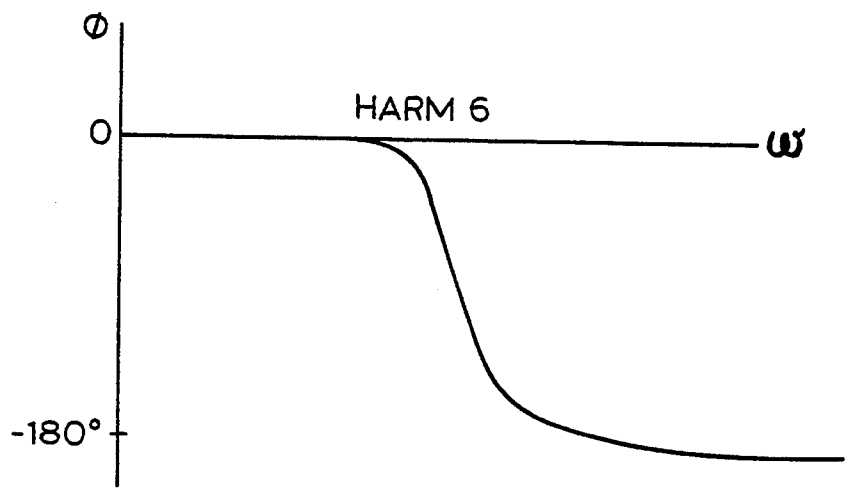

It should also be noted, however, that the frequency response of the filter 38 experiences a phase reversal at approximately its corner frequency. Shown in FIG. 8A and 8B are examples of the Bode plots for the filter 38 having a corner frequency at around the sixth harmonic of the inverter fundamental frequency. Specifically, as shown in FIG. 8A, the magnitude of the filter 38 frequency response increases around the sixth harmonic and then decreases toward zero. On the other hand, the phase of the filter 38 frequency response exhibits a phase reversal at approximately the sixth harmonic. In order to compensate for this phase reversal, a block 228 estimates the output frequency response function for the filter 38 and corrects the gradient vector GRAD(F), which is calculated according to equations (2) and (3), based upon this estimate for each of the harmonics detected by the Fast Fourier transform block 222.

Figure 8C:
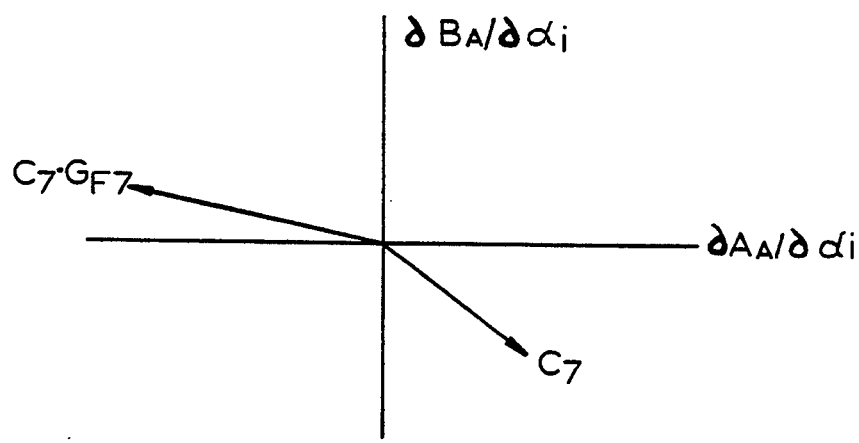

For example, the quantity C7 shown in FIG. 8C is derived from the first partial derivative terms in equation (3) such that $$C7 = \frac{\partial A_{KA}}{\partial \alpha_i} + j \frac{\partial B_{KA}}{\partial \alpha_i}.$$

If the term $G_{F7}$ as shown in FIG. 8C represents the magnitude and phase of the frequency response of the output of the filter 38 at a harmonic line-to-line voltage, then the new terms for these components of C7 in equation (3) can be determined by the following equation:

$$\left[ \frac{\partial A_{KA}}{\partial \alpha_i} + j \frac{\partial B_{KA}}{\partial \alpha_i} \right] \cdot [Re[G_{F7}] + jIm[G_{F7}]] \quad (24)$$

where $G_{F7} = M\angle -\phi$, M is the magnitude $G_{F7}$, and $-\phi$ is the phase of $G_{F7}$. Thus, the replacement terms for $$\frac{\partial A_{KA}}{\partial \alpha_i} \text{ and } \frac{\partial B_{KA}}{\partial \alpha_i}$$

in equation (3) are determined by the following equations:

$$\frac{\partial A'_{KA}}{\partial \alpha_i} = RE \text{ [Eq. 24]} \quad (25)$$

and $$\frac{\partial B'_{KA}}{\partial \alpha_i} = Im \text{ [Eq. 24]}. \quad (26)$$

Accordingly, the term $$\frac{\partial A_{KA}}{\partial \alpha_i}$$

of equation (3) is replaced by the real part of equation (24) and the term $$\frac{\partial B_{KA}}{\partial \alpha_i}$$

of equation (3) is replaced by the imaginary part of equation (24). The other partial derivative terms of equation (3) are similarly determined. Thus, equation (3) is adjusted for each phase-to-phase harmonic voltage across the filter 38.

As discussed above, the harmonics at the output of the inverter 26 are determined based upon the harmonics on the DC link 20. The translation of harmonics from the DC link 20 to the output of the inverter 26 assumes that the switches and other components of the inverter 26 are ideal components. Since actual components are not ideal, the outputs of the inverter 26 may be sampled in order to compensate for the non-idealized components of the inverter 26. Accordingly, one phase of the inverter 26 output is sampled by a block 230, it being understood that the other two outputs of the inverter 26 would be likewise sampled. A Fast Fourier Transform (FFT) block 232 operates upon the digital samples from the sampling block 230 and, since in actuality all three legs of the inverter 26 are sampled by the block 230, the block 232 produces line-to-line Fourier coefficients of the line-to-line voltages at the output of the inverter 26. A conditioning block 234, if desired, may normalize these Fourier coefficients from the block 232. Accordingly, the conditioning block 234 supplies terms corresponding to the A and B terms of equation (1) for the fundamental and harmonic voltages at the output of the inverter 26. The negative of these Fourier coefficients are then supplied to a summer 236. The summer 236 positively receives the output of the block 208. The summer 236 detects any difference between the Fourier coefficients based upon the DC link 20 and the actual Fourier coefficients at the output of the inverter 26.

This difference is delayed by a lag block 238. If the change in the switching angles determined by the Fletcher/Reeves search is insufficient to affect the output of the gate drive 216, no change occurs in the outputs of blocks 224 and 234. If there is no lag, any change that occurs in the output of the block 208 is supplied as a positive input directly to the summer 210 and as a negative input to the summer 210 through the summers 236 and 226. Thus, this change is canceled in the summer 210 resulting in no change of the objective function F and of the gradient vector GRAD (F). Therefore, the output from the summer 236 is delayed by a time constant, e.g. one second, to permit the objective function F and of the gradient vector GRAD (F) to be changed by small changes in the Fletcher/Reeves switching angles.

The difference between the Fourier coefficients from the block 208 and the Fourier coefficients from the conditioning block 234 is added by the summer 226 to the H terms and to the Fourier coefficients from the conditioning block 224 and supplied to the summer 210 to compensate for the non-idealized components of the inverter 26.

It should be noted that the present invention is not limited to the control of three-phase full-bridge inverters. For example, in a four-phase system, there are six phase-to-phase voltages $V_{AB}$, $V_{AC}$, $V_{AD}$, $V_{BC}$, $V_{BD}$, and $V_{CD}$. By controlling the harmonic content of any three of these phase-to-phase voltages, the remaining three phase-to-phase voltages are controlled. Thus, in a four-phase system, three phase-to-phase voltages are the minimum number of phase-to-phase voltages which can be controlled in order to control all six phase-to-phase voltages. If the control unit 28 were to control all of the phase-to-phase voltages or all of the phase-to-neutral voltages, it would require more computational time and/or hardware than if only the minimum number of phase-to-phase voltages were controlled. With phase-to-phase voltage control according to the present invention, harmonic distortion is allowed in the three phase-to-neutral voltages at the output of the inverter so long as the harmonic distortion in the phase-to-phase inverter output voltages is reduced. The result is that, in a three phase system, as much as 1.5 times as many harmonics in the phase-to-phase voltages can be substantially reduced or eliminated with the present invention, thereby allowing a greater reduction in the size and complexity of the output filter than with systems of the prior art. Even more harmonics in the phase-to-phase voltages can be substantially reduced or eliminated with the present invention in systems having more than three phases.

Although this invention has been illustrated and described in connection with the particular embodiments illustrated, it will be apparent to those skilled in the art that various changes may be made therein without departing form the spirit of the invention as set forth in the appended claims.

We claim:

1. An inverter system, comprising:
   an inverter for converting input DC power into output AC power, the output AC power having at least three output phase voltages and at least three output phase-to-phase voltages and the inverter having a plurality of inverter switches; and,
   inverter controlling means for determining an objective function having a value based solely upon harmonic content in less than all of said output phase-to-phase voltages as sensed from all of said output phase voltages and for controlling the inverter switches so as to generate output phase voltages which minimize the value of the objective function thereby minimizing said harmonic content generated by both said inverter and any load induced harmonics from load unbalances and non-linearities.

2. The inverter system of claim 1 wherein the inverter controlling means detects harmonic content in $N-1$ out of $N!/2(N-2)!$ phase-to-phase output voltages developed by the inverter, where N is the number of phases, and wherein the inverter controlling means includes means for supplying PWM pulses to the inverter switches, the PWM pulses having switching angles arranged to minimize the value of the objective function.

3. The inverter system of claim 1 wherein the inverter controlling means comprises first angle set means for supplying PWM pulses having a first set of switching angles to the inverter switches and means for determining a first value for the objective function based upon a first harmonic content in the phase-to-phase voltages as the inverter switches are operated in accordance with the PWM pulses having the first set of switching angles.

4. The inverter system of claim 3 wherein the inverter controlling means includes means for providing PWM pulses having a second set of switching angles to the inverter switches and for determining a value of a second objective function based upon a second harmonic content in the phase-to-phase voltages as the inverter switches are operated in accordance with the PWM pulses having the second set of switching angles.

5. A method of developing N phase-to-phase AC output voltages, the method comprising the steps of;
   supplying DC power to a plurality of inverter switches, the inverter switches being coupled to N output lines;
   supplying PWM pulses to the inverter switches so that the inverter switches convert the DC power into the N phase-to-phase output voltages, the PWM pulses having switching angles;
   determining a value of an objective function based upon the harmonic content in less than all of the N phase-to-phase AC output voltages;
   adjusting the switching angles so as to minimize the value of the objective function; and wherein
   the step of determining a value of an objective function comprises the step of adjusting the objective function for effects due to a non-idealized inverter.

6. An inverter system, comprising:
   an inverter for converting DC power into AC power, the AC power having at least three phase-to-phase voltages and the inverter having a plurality of inverter switches; and
   inverter controlling means for determining an objective function having a value based upon harmonic content in phase-to-phase voltages and for controlling the inverter switches so as to minimize the value of the objective function; and wherein
   the inverter controlling means determines the objective function based upon less than all of the phase-to-phase voltages; and wherein
   the inverter controlling means comprises first angle set means for supplying PWM pulses having a first set of switching angles to the inverter switches and means for determining a first value for the objective function based upon a first harmonic content in the phase-to-phase voltages as the inverter switches are operated in accordance with the PWM pulses having the first set of switching angles; and wherein
   the inverter controlling means includes means for providing PWM pulses having a second set of switching angles to the inverter switches and for determining a value of a second objective function based upon a second harmonic content in the phase-to-phase voltages as the inverter switches are operated in accordance with the PWM pulses having the second set of switching angles; and wherein
   the inverter controlling means comprises means for determining the second set of switching angles based upon a distance along a search vector, the search vector comprising a plurality of values, each value of the plurality of values being a function of a derivative of the first objective function with respect to a corresponding switching angle of the first set of switching angles.

7. An inverter system, comprising:
   an inverter for converting DC power into AC power, the AC power having at least three phase-to-phase voltages and the inverter having a plurality of inverter switches; and
   inverter controlling means for determining an objective function having a value based upon harmonic content in phase-to-phase voltages and for controlling the inverter switches so as to minimize the value of the objective function; and wherein
   the inverter controlling means determines the objective function based upon less than all of the phase-to-phase voltages; and wherein
   the inverter controlling means comprises first angle set means for supplying PWM pulses having a first set of switching angles to the inverter switches and means for determining a first value for the objective function based upon a first harmonic content in the phase-to-phase voltages as the inverter switches are operated in accordance with the PWM pulses having the first set of switching angles; and wherein
   the inverter controlling means includes means for providing PWM pulses having a second set of switching angles to the inverter switches and for determining a value of a second objective function based upon a second harmonic content in the phase-to-phase voltages as the inverter switches are operated in accordance with the PWM pulses having the second set of switching angles; and wherein the inverter controlling means comprises determining means for determining a first gradient vector comprising a first plurality of values, each value of the first plurality of values being a function of a derivative of the first objective function with respect to a corresponding switching angle of the first set of switching angles, and for determining a second gradient vector comprising a second plurality of values, each value of the second plurality of values being a function of a derivative of the second objective function with respect to a corresponding switching angle of the second set of switching angles.

8. The inverter system of claim 7 wherein the inverter controlling means comprises means for determining a quantity $F_{CUBIC}$ as a function of $\alpha$ and for determining $\alpha^*$ where $\alpha^*$ is the value of $\alpha$ which results in the smallest $F_{CUBIC}$, $F_{CUBIC}$ being determined according to the following equation:

$$F_{CUBIC}=a_0+a_1\alpha+a_2\alpha^2+a_3\alpha^3$$

where $a_0$, $a_1$, $a_2$ and $a_3$ are based, at least in part, upon the first and second objective functions and upon the first and second gradient vectors.

9. The inverter system of claim 8 wherein the inverter controlling means comprises means for determining a third set of switching angles based upon $\alpha^*$, for transmitting the third set of switching angles to the inverter switches, and for determining a third objective function based upon a third harmonic content in the phase-to-phase voltages, the third harmonic content occurring during switching of the inverter switches according to the third set of switching angles.

10. The inverter system of claim 9 wherein the inverter control means comprises means for determining which of the first, second and third objective functions is smallest and for controlling the inverter switches with the set of switching angles resulting in the smallest of the first, second and third objective functions.

11. The inverter system of claim 7 wherein the inverter comprises a filter having a frequency response to an input and wherein the inverter control means comprises means for determining the frequency response of the filter and for adjusting at least the first objective function and at least the first gradient vector for the frequency response of the filter.

12. The inverter system of claim 11 wherein the inverter control means comprises means for adjusting at least the first objective function for effects due to a non-idealized inverter.

13. An inverter system, comprising:
an inverter for converting DC power into AC power, the AC power having at least three phase-to-phase voltages and the inverter having a plurality of inverter switches; and
inverter controlling means for determining an objective function having a value based upon harmonic content in phase-to-phase voltages and for controlling the inverter switches so as to minimize the value of the objective function; and wherein
the inverter comprises a filter having a frequency response to an input and wherein the inverter control means comprises means for determining the frequency response of the filter and for adjusting the objective function for the frequency response of the filter.

14. The inverter system of claim 13 wherein the inverter control means comprises means for adjusting the objective function for effects due to a non-idealized inverter.

15. An inverter system, comprising:
an inverter for converting DC power into AC power, the AC power having at least three phase-to-phase voltages and the inverter having a plurality of inverter switches; and
inverter controlling means for determining an objective function having a value based upon harmonic content in phase-to-phase voltages and for controlling the inverter switches so as to minimize the value of the objective function; and wherein
the inverter control means comprises means for adjusting the objective function for effects due to a non-idealized inverter.

16. A method of developing N phase-to-phase AC output voltages, the method comprising the steps of;
supplying DC power to a plurality of inverter switches, the inverter switches being coupled to N output lines;
supplying PWM pulses to the inverter switches so that the inverter switches convert the DC power into the N phase-to-phase output voltages, the PWM pulses having switching angles;
determining a value of an objective function based upon the harmonic content in less than all of the N phase-to-phase AC output voltages;
adjusting the switching angles so as to minimize the value of the objective function; and wherein
the inverter comprises a filter having a frequency response to an input and wherein the step of determining a value of an objective function comprises the steps of determining the frequency response of the filter and of adjusting the objective function for the frequency response of the filter.

17. The method of claim 16 wherein the step of determining a value of an objective function comprises the step of adjusting the objective function for effects due to a non-idealized inverter.

18. A method of developing N phase-to-phase AC output voltages, the method comprising the steps of;
supplying DC power to a plurality of inverter switches, the inverter switches being coupled to N output lines;
supplying PWM pulses to the inverter switches so that the inverter switches convert the DC power into the N phase-to-phase output voltages, the PWM pulses having switching angles;
determining a value of an objective function based upon the harmonic content in less than all of the N phase-to-phase AC output voltages;
adjusting the switching angles so as to minimize the value of the objective function; and
determining a vector comprising a plurality of values, each value of the plurality of values being a function of a derivative of the first objective function with respect to a corresponding switching angle of the first set of switching angles, and of determining the second set of switching angles based upon a distance $\rho$ along the vector; and wherein
the step of supplying the PWM pulses to the inverter switches comprises the step of supplying PWM pulses having a first set of switching angles to the inverter switches and wherein the step of determining an objective function comprises the step of determining a first objective function based upon the a first phase-to-phase harmonic content between respective pairs of the output lines of the inverter switches, the first phase-to-phase harmonic content occurring during supplying to the inverter switches of the PWM pulses having the first set of switching angles; and wherein the step of supplying the PWM pulses to the inverter switches comprises the step of supplying PWM pulses having a second set of switching angles of the inverter switches and wherein the step of determining an objective function comprises the step of determining a second objective function based upon a second phase-to-phase harmonic content between respective pairs of the output lines of the inverter switches, the second phase-to-phase harmonic content occurring during supply to the inverter switches of the PWM pulses having the second set of switching angles.

19. An inverter system, comprising:

an inverter for converting DC power into AC power in accordance with a the PWM pulse pattern having switching angles; and an inverter controller having means responsive to harmonic content in the DC power for determining a value for an objective function as a function of harmonic content in the AC power, and means for controlling the switching angles so as to minimize the value of the objective function; and wherein the inverter controller comprises first angle set means for supplying PWM pulses having a first set of switching angles to the inverter and for determining a first objective function indicating a first harmonic content in the AC power, the first objective function determined from harmonic content in the DC power, the first harmonic content in the AC power occurring during supply to the inverter of the PWM pulses having the first set of switching angles; and wherein the inverter controller comprises second angle set means for supplying PWM pulses having a second set of switches angles to the inverter and for determining a second objective function indicating a second harmonic content in the AC power, the second objective function being determined from harmonic content in the DC power, the second harmonic content in the AC power occurring during supply to the inverter of the PWM pulses having the second set of switching angles; and wherein the second angle set means comprises means for determining the second set of switching angles based upon a distance along a vector, the vector comprising a plurality of values, each value being dependent upon a derivative of the first objective function with respect to a corresponding switching angle of the first set of switching angles.

20. An inverter system, comprising:

an inverter for converting DC power into AC power in accordance with the PWM pulse pattern having switching angles; and an inverter controller having means responsive to harmonic content in the DC power for determining a value for an objective function as a function of harmonic content in the AC power, and means for controlling the switching angles so as to minimize the value of the objective function; and wherein the inverter controller comprises first angle set means for supplying PWM pulses having a first set of switching angles to the inverter and for determining a first objective function indicating a first harmonic content in the AC power, the first objective function determined from harmonic content in the DC power, the first harmonic content in the AC power occurring during supply to the inverter of the PWM pulses having the first set of switching angles; and wherein the inverter controller comprises second angle set means for supplying PWM pulses having a second set of switching angles to the inverter and for determining a second objective function indicating a second harmonic content in the AC power, the second objective function being determined from harmonic content in the DC power, the harmonic content in the AC power occurring during supply to the inverter of the PWM pulses having the second set of switching angles; and wherein the inverter controller comprises means for determining a first gradient vector comprising a first plurality of values, each value of the first plurality of values being dependent upon a derivative of the first objective function with respect to a corresponding switching angle of the first set of switching angles, and for determining a second gradient vector comprising a second plurality of values, each value of the second plurality of values being dependent upon a derivative of the second objective function with respect to a corresponding switching angle of the second set of switching angles.

21. The inverter system of claim 20 wherein the inverter controller comprises means for determining a quantity $F_{CUBIC}$ as a function of $\alpha$ and for determining $\alpha^*$ where $\alpha^*$ is the value of e which results in the smallest $F_{CUBIC}$, $F_{CUBIC}$ being determined according to the following equation:

$$F_{CUBIC} = a_0 + a_1\alpha + a_2\alpha^2 + a_3\alpha^3$$

where $a_0$, $a_1$, $a_2$ and $a_3$ are based, at least in part, upon the first and second objective functions and upon the first and second gradient vectors.

22. The inverter system of claim 21 wherein the inverter controller comprises means for determining a third set of switching angles based upon $\alpha^*$, for supplying PWM pulses having the third set of switching angles to the inverter means, and for determining a third objective function indicating a third harmonic content in the AC power, the third objective function being determined from harmonic content in the DC power, the third harmonic content in the AC power occurring during supply to the inverter means of the PWM pulses having the third set of switching angles.

23. The inverter system of claim 22 wherein the inverter controller comprises means for determining which of the first, second and third objective functions is smallest and for controlling the inverter with the set of switching angles resulting in the smallest of the first, second and third objective functions.

24. The inverter system of claim 23 wherein the inverter comprises inverting means for inverting the DC power into AC power having N phases, the N phases of AC power having a plurality of phase-to-phase AC signals and the inverting means having a plurality of inverter switches, and wherein the inverter controller comprises means for determining the first, second, and third objective functions based upon harmonic content in a minimum number of the phase-to-phase AC signals.

25. The inverter system of claim 20 wherein the inverter comprises a filter having a frequency response to an input and wherein the inverter control means comprises means for determining the frequency response of the filter and for adjusting at least the first objective function and at least the first gradient vector for the frequency response of the filter.

26. The inverter system of claim 25 wherein the inverter control means comprises means for adjusting at least the first objective function for effects due to a non-idealized inverter.

27. An inverter system, comprising:
   an inverter for converting DC power into AC power in accordance with a the PWM pulse pattern having switching angles; and
   an inverter controller having means responsive to harmonic content in the DC power for determining a value for an objective function as a function of harmonic content in the AC power, and means for controlling the switching angles so as to minimize the value of the objective function; and wherein
   the inverter comprises a filter having a frequency response to an input and wherein the inverter control means comprises means for determining the frequency response of the filter and for adjusting the objective function for the frequency response of the filter.

28. The inverter system of claim 27 wherein the inverter control means comprises means for adjusting the objective function for effects due to a non-idealized inverter.

29. An inverter system, comprising:
   an inverter for converting DC power into AC power in accordance with a the PWM pulse pattern having switching angles; and
   an inverter controller having means responsive to harmonic content in the DC power for determining a value for an objective function as a function of harmonic content in the AC power, and means for controlling the switching angles so as to minimize the value of the objective function; and wherein
   the inverter control means comprises means for adjusting the objective function for effects due to a non-idealized inverter.

30. A method of developing N phase-to-phase AC output voltages, the method comprising the steps of;
   supplying DC power to a plurality of inverter switches, the inverter switches being coupled to N output lines;
   supplying PWM pulses to the inverter switches so that the inverter switches convert the DC power into the N phase-to-phase output voltages, the PWM pulses having switching angles;
   determining a value of an objective function based upon the harmonic content in less than all of the N phase-to-phase AC output voltages;
   adjusting the switching angles so as to minimize the value of the objective function; and
   determining a first gradient vector having a first plurality of values, each value of the first plurality of values being a function of a derivative of the first objective function with respect to a corresponding switching angle of the first set of switching angles, and of determining a second gradient vector having a second plurality of values, each value of the second plurality of values in the second gradient vector being a function of a derivative of the second objective function with respect to a corresponding switching angle of the second set of switching angles; and wherein the step of supplying the PWM pulses to the inverter switches comprises the step of supplying PWM pulses having a first set of switching angles to the inverter switches and wherein the step of determining an objective function comprises the step of determining a first objective function based upon the a first phase-to-phase harmonic content between respective pairs of the output lines of the inverter switches, the first phase-to-phase harmonic content occurring during supply to the inverter switches of the PWM pulses having the first set of switching angles; and wherein the step of supplying the PWM pulses to the inverter switches comprises the step of supplying PWM pulses having a second set of switching angles to the inverter switches and wherein the step of determining an objective function comprises the step of determining a second objective function based upon a second phase-to-phase harmonic content between respective pairs of the output lines of the inverter switches, the second phase-to-phase harmonic content occurring during supply to the inverter switches of the PWM pulses having the second set of switching angles.

31. The method of claim 30 wherein the inverter comprises a filter having a frequency response to an input and wherein the step of determining a value of an objective function comprises the steps of determining the frequency response of the filter and of adjusting at least the first objective function and at least the first gradient vector for the frequency response of the filter.

32. The method of claim 31 wherein the step of determining a value of an objective function comprises the step of adjusting at least the first objective function for effects due to a non-idealized inverter.

33. The method of claim 30 wherein the step of determining an objective function comprises the further steps of determining a quantity $F_{CUBIC}$ as a function of $\alpha$ and of determining $\alpha^*$ where $\alpha^*$ is the value of $\alpha$ which results in the smallest $F_{CUBIC}$, $F_{CUBIC}$ being determined according to the following equation:

$$F_{CUBIC} = a_0 + a_1\alpha + a_2\alpha^2 + a_3\alpha^3$$

where $a_0$, $a_1$, $a_2$ and $a_3$ are based upon the first and second objective functions and upon the first and second gradient vectors.

34. The method of claim 33 wherein the step of supplying the PWM pulses to the inverter switches comprises the steps of determining a third set of switching angles based upon $\alpha^*$ and of supplying PWM pulses having the third set of switching angles to the inverter switches, and wherein the step of determining an objective function comprises the step of determining a third objective function based upon a third phase-to-phase harmonic content between respective pairs of the output lines of the inverter switches, the third phase-to-phase harmonic content occurring during supply to the inverter switches of the PWM pulses having the third set of switching angles.

35. The method of claim 34 wherein the step of supplying the PWM pulses to the inverter switches comprises the steps of determining which of the first, second and third objective functions is smallest and of controlling the inverter switches with the set of switching angles resulting in the smallest of the first, second and third objective functions.

* * * * *